US010458624B2

United States Patent
Dross (10) Patent No.: US 10,458,624 B2
(45) Date of Patent: Oct. 29, 2019

(54) OPTICAL SYSTEM FOR COLLIMATION OF LIGHT

(71) Applicant: SIGNIFY HOLDING B.V., Eindhoven (NL)

(72) Inventor: Oliver Dross, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/315,819

(22) PCT Filed: Jun. 2, 2015

(86) PCT No.: PCT/EP2015/062191
§ 371 (c)(1),
(2) Date: Dec. 2, 2016

(87) PCT Pub. No.: WO2015/185519
PCT Pub. Date: Dec. 10, 2015

(65) Prior Publication Data
US 2017/0114984 A1    Apr. 27, 2017

(30) Foreign Application Priority Data
Jun. 2, 2014  (EP) .................................... 14170778

(51) Int. Cl.
*F21V 13/04*   (2006.01)
*F21V 7/00*    (2006.01)
(Continued)

(52) U.S. Cl.
CPC .............. *F21V 13/04* (2013.01); *F21V 5/007* (2013.01); *F21V 7/0025* (2013.01);
(Continued)

(58) Field of Classification Search
CPC . F21V 5/00; F21V 5/02; F21V 7/0016; F21V 7/009; F21V 7/0091; F21V 13/04;
(Continued)

(56) References Cited

U.S. PATENT DOCUMENTS 6,547,423 B2 *  4/2003  Marshall ................... F21V 5/04
                                                    257/E33.072
7,349,163 B2 *  3/2008  Angelini ................... F21V 3/04
                                                        359/708
(Continued)

FOREIGN PATENT DOCUMENTS

DE    202014003078 U1    4/2014
EP        2276076 A1    1/2011
(Continued)

*Primary Examiner* — Bryon T Gyllstrom
(74) *Attorney, Agent, or Firm* — Akarsh P. Belagodu (57) ABSTRACT

An optical system for collimation of incoming light, comprising: a body (102); a recess (110) formed on a first side (104) of the body (102), the recess (110) having a central light entry surface (114) and a side light entry surface (112); a central light exit surface (118) provided at a second side of the body (108), which second side (108) is opposite to said first side (104); said central light entry surface (114) being arranged in relation to the central light exit surface (118) such that incoming light falling on the central light entry surface (114) is directed to the central light exit surface (118), a total internal reflection surface (116) provided at a side surface of the body (102), which is arranged such that incoming light falling on the side light entry surface (112) of the recess (110) is directed towards the total internal reflection surface (116) so as to be subject to total internal reflection towards the second side (108) of the body (102); and a rejection area (120) surrounding said central light entry surface (114), said rejection area (120) being configured to prevent incoming light to exit said body (102) through said second side (108).

12 Claims, 3 Drawing Sheets

(51) Int. Cl.
  *G02B 19/00* (2006.01)
  *F21V 5/00* (2018.01)
  *G02B 17/00* (2006.01)
  *G02B 27/30* (2006.01)
  *F21Y 105/10* (2016.01)
  *F21Y 115/10* (2016.01)

(52) U.S. Cl.
  CPC .......... *F21V 7/0091* (2013.01); *G02B 17/006* (2013.01); *G02B 19/0028* (2013.01); *G02B 19/0047* (2013.01); *G02B 27/30* (2013.01); *F21V 7/0083* (2013.01); *F21Y 2105/10* (2016.08); *F21Y 2115/10* (2016.08)

(58) Field of Classification Search
  CPC .... F21V 5/04; F21S 48/1233; F21Y 2101/02; F21L 14/02
  USPC ..... 362/308, 326, 327, 335, 340, 310, 296.1
  See application file for complete search history.

(56) References Cited

U.S. PATENT DOCUMENTS

| | | | |
|---|---|---|---|
| 8,029,163 B2* | 10/2011 | Chen | F21V 5/04 362/308 |
| 8,430,536 B1 | 4/2013 | Zhao | |
| 8,591,077 B2* | 11/2013 | Okada | F21V 5/007 362/327 |
| 8,783,885 B2 | 7/2014 | Kretschmann et al. | |
| 8,789,983 B2* | 7/2014 | Parkyn | F21V 5/04 362/326 |
| 2002/0080615 A1 | 6/2002 | Marshall et al. | |
| 2005/0201100 A1 | 9/2005 | Cassarly et al. | |
| 2007/0147041 A1* | 6/2007 | Shiratsuchi | F21V 5/007 362/268 |
| 2010/0039830 A1 | 2/2010 | Cheung et al. | |
| 2010/0110695 A1 | 5/2010 | Nakamura | |
| 2011/0013398 A1* | 1/2011 | Chien | F21S 9/02 362/249.06 |
| 2011/0080725 A1 | 4/2011 | Brands et al. | |
| 2012/0113653 A1* | 5/2012 | Koizumi | F21V 5/04 362/327 |
| 2013/0063960 A1* | 3/2013 | Nakano | F21S 41/192 362/516 |
| 2014/0233217 A1* | 8/2014 | Takatori | G09F 13/04 362/97.1 |

FOREIGN PATENT DOCUMENTS

| | | |
|---|---|---|
| FR | 2966902 A1 | 5/2012 |
| JP | 4191181 B2 | 4/2006 |
| JP | 2012151017 A | 8/2012 |
| JP | 2012243641 A | 12/2012 |
| JP | 2014003168 A | 1/2014 |
| WO | WO2009016586 A1 | 2/2009 |
| WO | WO2013088299 A1 | 6/2013 |

* cited by examiner

Fig. 1

PRIOR ART

OPTICAL SYSTEM FOR COLLIMATION OF LIGHT

CROSS-REFERENCE TO PRIOR APPLICATIONS

This application is the U.S. National Phase application under 35 U.S.C. § 371 of International Application No. PCT/EP2015/062191, filed on Jun. 2, 2015, which claims the benefit of European Patent Application Ser. No. 14170778.6, filed on Jun. 2, 2014. These applications are hereby incorporated by reference herein.

FIELD OF THE INVENTION

The present invention relates to optical systems for collimating light from a light source.

BACKGROUND OF THE INVENTION

In lighting devices, it is often desired to make use of an optical system that controls the direction of light emitted from a light source. One such optical system that is frequently used is a collimator making use of total internal reflection (TIR), a so-called TIR collimator.

Figure 1:
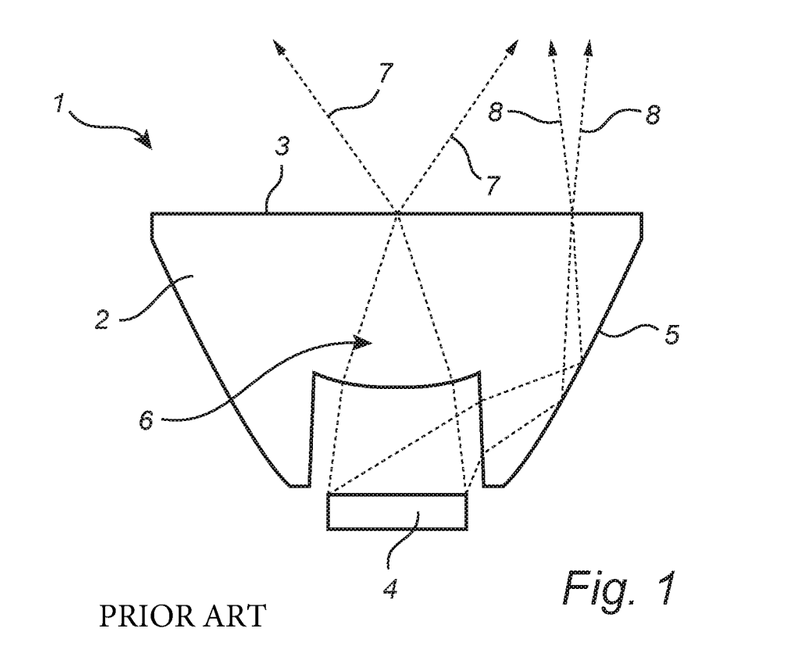
FIG. 1 illustrates a prior art optical system having a lens making use of total internal reflection and demonstrating the problem of large cone angles emitted from the central portion of the optical system.

In FIG. 1 a prior art TIR collimator 1 in the form of a lens body 2 making use of total internal reflection is illustrated. As seen in FIG. 1, an extended light source 4 produces very wide cone angles for light rays 7 passing through a center portion 6 of the lens body 2, while in most regions light rays 8 that hits a TIR surface 5 produce quite narrow cone angles. Hence, a problem with the prior art TIR collimator 1 according to FIG. 1 is that cone angles emitted by different portions of the light exit surface 3 is highly non uniform. So when looking back into the TIR collimator, in a certain off axis angular range, no light will be emitted towards the observer from the TIR surface but only from the center portion; hence, a bright spot will be seen when observing a lighting device comprising the TIR collimator 1.

Hence, the emitted cone angle of light from the TIR collimator 1 typically is significantly larger for light passing through a central collimating portion 6 of the lens body 2 of the TIR collimator 1 than for light being subject to total internal reflection at the TIR surface 5. This implies that at an angle displaced from a main axis along which the light from the TIR collimator is directed, there will be a clearly observable distinction in luminance between light emitted from the central collimating portion 6 and light being subject to total internal reflection. Hence, the emitted light is observed at such an off-axis angle as a bright spot within a darker area. For spot lamps using several light sources and a TIR collimator array, the light emitted will be perceived as very spotty with the individual light sources being clearly distinguishable as bright spots with surrounding dark areas.

Accordingly, there is a need to improve light illumination from a TIR collimator such that the above mentioned spotty behavior is minimized.

SUMMARY OF THE INVENTION

It is an object of the present invention to at least partly overcome the above problems, and to enable illumination from an optical system that minimizes the above mentioned spotty behavior.

In particular according to a first aspect of the invention, an optical system for collimation of incoming light is provided. The optical system comprises a body; a recess formed on a first side of the body, the recess having a central light entry surface and a side light entry surface; a central light exit surface provided at a second side of the body, which second side is opposite to said first side; said central light entry surface being arranged in relation to the central light exit surface such that incoming light falling on the central light entry surface is directed to the central light exit surface, a total internal reflection surface provided at a side surface of the body, which is arranged such that incoming light falling on the side light entry surface of the recess is directed towards the total internal reflection surface so as to be subject to total internal reflection towards the second side of the body; and a rejection area surrounding said central light entry surface, said rejection area being configured to prevent incoming light to exit said body through said second side.

According to the invention, incoming light entering the optical system at a rejection area will be prevented from being emitted through the light emitting side of a body of the optical system. The optical system may be designed such that the light entering the central light entry surface is controlled to be emitted from the optical system with desired properties. Since a central light entry surface is surrounded by the rejection area, the designing of the optical system to provide desired properties may be performed without effects on an outer part of a beam of incoming light affecting an achieved result of the designing of the optical system.

In particular, the optical system allows incoming light to be guided into the optical system through the central light entry surface and be emitted out of the central light exit surface with a narrow emission angle. Therefore, the optical system enables a TIR lens to be formed such that a well-collimated beam is provided from the TIR lens and any bright spots originating from the central part of the optical system may be eliminated.

According to an embodiment of the invention, the rejection area comprises a light-deflecting portion, wherein the light-deflecting portion is arranged such that incoming light entering the light-deflecting portion is directed towards the second side with an angle larger than a total reflection critical angle. This implies that the light-deflecting portion controls incoming light such that it is prevented from exiting the body through the second side due to a total internal reflection occurring in the second side surface. Hence, the central light entry surface is surrounded by a portion that controls incoming light in such manner that the light does not exit the body through the second side. This ensures that the optical system may be designed such that the light entering the central light entry surface is controlled to be emitted from the optical system with desired properties.

According to an embodiment, the light-deflecting portion comprises an indentation extending from the recess into the body. The indentation may be arranged to extend substantially along the path of incoming light. This implies that the light will hit the surface of the indentation at an oblique angle and that the incoming light will be deflected in a large angle away from the central light entry surface. This facilitates the light being directed to the second side at an angle larger than the total reflection critical angle.

The indentation may be arranged to surround the central light entry surface. This implies that an outer part of a beam of incoming light will enter the indentation and will therefore be deflected in such manner as to not exit the second side of the body. Hence, a well-collimated beam of light exiting the light exit surface may be formed from the light entering the central light entry surface.

The indentation may comprise a concave surface. This implies that the incoming light entering the indentation is ensured to hit the surfaces of the indentation at an oblique angle, facilitating the light being directed to the second side at an angle larger than the total reflection critical angle.

According to another embodiment, the light-deflecting portion comprises a side wall portion of the recess. This implies that a side wall portion of the recess surrounding the central light entry surface is arranged to deflect incoming light hitting the side wall portion such that the light is guided to hit the second side at an angle larger than the total reflection critical angle. In this embodiment, the recess may be arranged to extend far into the body. This implies that the central light entry surface may be arranged to receive light having a small angular cone, since the central light entry surface may be arranged at a distance away from the light source. Hence, the optical system may be arranged to emit a well-collimated beam from the light exit surface, since the incoming light entering the central light entry surface has a small angular cone. Further, the side wall portion of the recess may be arranged to extend in a direction forming a small angle to an optical axis of the incoming light. This implies that the incoming light may hit the side wall portion at an oblique angle, such that the light is deflected in a large angle away from the central light entry surface, whereby the light being directed to the second side at an angle larger than the total reflection critical angle is facilitated.

In an embodiment, the central light exit surface may be flat. This may be especially suitable when the recess extends far into the body such that incoming light enters the central light entry surface with a small angular cone. Incoming light having a narrow angular cone may facilitate a well-collimated beam being emitted through the central light exit surface.

In another embodiment, the central light exit surface may be convex. A convex central light exit surface may function to form light entering the central light entry surface to be emitted from the central light exit surface with a narrow emission angle. Hence, by means of providing a convex central light exit surface, a well-collimated beam may be emitted from the body.

According to an embodiment, the rejection area may comprise a layer of material which absorbs, scatters or specularly reflects incoming light, wherein the layer is arranged on a surface surrounding the central light entry surface. The layer of material may thus prevent incoming light falling on the absorbing, scattering, or specularly reflecting material to exit the body through the second side. The incoming light may be absorbed in order to stop the light from propagating into the body and, hence, also prevent the light falling on the material to exit the body through the second side. In addition or alternative to the absorbtion of incoming light, the layer of material may be diffusely scattering. Hence, part of the light may be back-scattered when hitting particles in the material and with a proper thickness of the layer, incoming light is prevented from entering the body through the layer of material. In addition or alternative to the absorption and/or scattering of incoming light, the layer of material may be specularly reflective of incoming light such that incoming light is reflected off the surface of the layer and prevented from entering the body through the layer of material.

According to an embodiment, the central light entry surface and the light exit surface are arranged in relation to each other so as to form Köhler integrating lenses. Such a setup implies that the optical system may provide an illumination that is affected to a limited degree by any artifacts from luminance and color non-uniformities of the light source.

According to an embodiment, the body comprises a plurality of recesses, each having a central light entry surface for receiving incoming light, and a plurality of rejection areas, each being arranged surrounding a central light entry surface. This implies that the body may be provided as a single unit that may accommodate a plurality of light sources. Hence, if a plurality of light sources are desired for providing illumination from the optical system, a single body may be arranged over all of the plurality of light sources.

According to a second aspect of the invention a lighting device is provided. The lighting device comprises the optical system of the first aspect of the invention and a light source arranged in close relation to the recess of the optical system. This allows for implementation of the optical system in illumination applications.

According to an embodiment, the lighting device may comprise a reflective enclosure, which is arranged around the side surface and the first side of the body of the optical system. This implies that light that may be emitted from the body in a backwards direction, by scattering or reflection from the rejection area or by TIR from the second side, may be reflected by the enclosure back into the body and may further contribute to the light being provided from the optical system in a substantially uncolimated manner. Hence, a better light economy may be achieved.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention. As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 2:
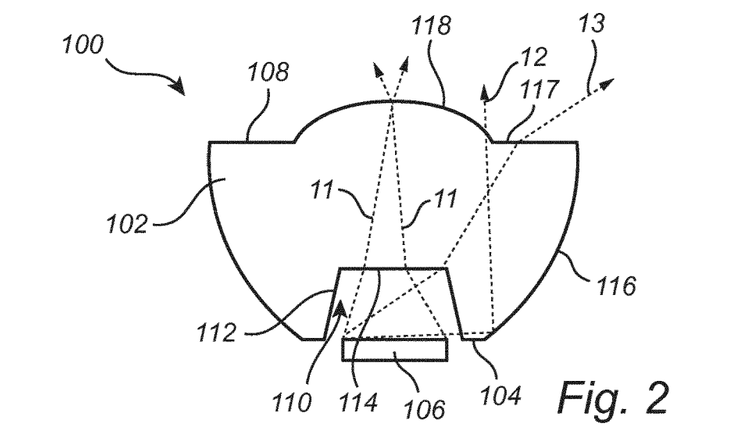
FIG. 2 illustrates an optical system having a lens making use of total internal reflection and demonstrating limitations of designing such an optical system.

FIG. 2 shows a cross-section of an optical system 100 for collimation of incoming light. The optical system 100 comprises a body 102, which is formed of a material allowing propagation of light therethrough. Typically, the body 102 may be formed of a plastic material, such as polycarbonate (PC) or any other plastic material that may be suitable for optical applications. Other materials, such as glass, may also be contemplated. The body 102 comprises a first side 104, which is intended to face a light source 106 providing incoming light. The body 102 also comprises a second side 108, which is opposite to the first side 104. The body 102 is intended to receive incoming light through the first side 104 of the body 102 and to emit light through the second side 108 of the body 102.

The body 102 comprises a recess 110 formed on the first side 104 of the body 102. The recess 110 has side walls 112 extending into the body 102. Further, at a bottom of the recess 110, a central bottom surface 114 of the recess 110 is formed. The recess 110 may have a rotationally symmetric shape of the side walls 112, such that the side walls 112 will affect incoming light equally around the entire circumference of the recess 110. For instance, the recess 110 may form a circular cylindrical shape or a shape of a truncated cone having a circular cylindrical cross-section.

The body 102 is intended to be arranged in relation to a light source 106 such that the recess 110 is arranged over the light source 106. Hence, light emitted from the light source 106 may form incoming light entering the body 102 through the recess 110. In this regard, the side walls 112 of the recess 110 may form a side light entry surface 112 of the recess 110, whereas the bottom surface 114 may form a central light entry surface 114 of the recess 110.

The recess 110 may be sufficiently large so as to accommodate an extended light source 106, which may emit light over an extended area. However, the optical system 100 may function equally well in relation to a point light source.

Incoming light passing through the central light entry surface 114 into the body 102 will be directed to propagate through the body to a portion of the second side 108, which portion forms a central light exit surface 118. The central light entry surface 114 and the central light exit surface 118 together form a central collimating lens of the optical system 100. The central collimating lens of the optical system 100 interacts with incoming light so as to form an emitted beam of light having a narrow emission angle.

In order to form a central collimating lens, different combinations of curved surfaces of the central light entry surface 114 and the central light exit surface 118 may be contemplated. For instance, the central light entry surface 114 may be convex, while the central light exit surface 118 may also be convex or flat. Alternatively, the central light entry surface 114 may be flat, while the central light exit surface 118 may be convex. In fact, the central light entry surface 114 may in certain embodiments even be concave, while the central light exit surface 118 may be convex.

The central light entry surface 114 and the central light exit surface 118 may be substantially parallel to each other. This implies that incoming light entering through the central light entry surface 114 may be affected by the curvature of the central light entry surface 114 and the central light exit surface 118, but no or minimal deflection of a main propagation direction of the light should occur due to the central light entry surface 114 and the central light exit surface 118 being angled in relation to each other.

The body 102 further comprises a side surface 116. The side surface 116 may extend from the first side 102 to the second side 108. The side surface 116 is arranged in such manner that light entering the body 102 through the side light entry surface 112 will be subject to total internal reflection (TIR) in the side surface 116. This implies that the light will be incident on the side surface 116 with such a large angle that the light would be deflected in the boundary surface between the side surface 116 and the medium surrounding the body 102 to an angle larger than 90°, i.e. the light may not exit the body 102 through the side surface 116 and is totally reflected instead. For TIR to occur it is needed that the refractive index of the body 102 is larger than the refractive index of the surrounding medium, whereby light incident on the boundary surface in the body 102 at an incident angle with respect to the normal of the boundary surface will be refracted to an exit angle larger than the incident angle. Then, TIR will occur for light incident on the boundary surface at an angle larger than a critical angle, at which the light is refracted exactly to a 90° angle to the normal of the boundary surface. Hence, the side surface 116 forms a TIR surface 116. The body 102 may be provided with a coating on the outside of the surface 116 in order to improve reflection on the surface where TIR would fail.

The light being reflected in the TIR surface 116 will be directed by the reflection towards a peripheral light exit surface 117 of the second side 108. The TIR surface 116 may be arranged in relation to the peripheral light exit surface 117 such that light being subject to TIR in the TIR surface 116 will be emitted through the second side 108 forming mainly parallel light rays, such that a well-collimated beam is formed by the light subject to TIR. This may be achieved by means of the reflection in the TIR surface 116 reflecting light to a well-collimated beam after reflection. Then, the light is directed to be incident on the peripheral light exit surface 117 along a normal to the second side 108, or at least forming a small angle to the normal. This implies that the light will not be deflected at all, or only to a small extent, when passing through the second side 108 in order to maintain a well-collimated beam when emitted from the body 102. However, it may also be contemplated that the second side 108 is curved, for instance concave, in order to deflect the light reflected from the TIR surface 116 so as to collimate the light when being emitted from the body 102.

As described above, the optical system 100 is arranged to interact with incoming light in two different manners for forming an emitted light beam. Part of the incoming light passes through the central collimating lens of the optical system 100 and part of the incoming light is subject to TIR in the TIR surface 116 in order to contribute to the emitted light beam of the optical system 100. The light emitted from the body 102 is emitted through the second side 108, which comprises the central light exit surface 118 adapted to act as part of a central collimating lens and the peripheral light exit surface 117 adapted to provide collimated light from the TIR surface 116. That is, the second side 108 comprises two different portions adapted to act as part of a central collimating lens and to provide collimated light from the TIR surface 116. However, if a ray of light that has been subject to TIR exits the second side 108 through the central light exit surface 118, such ray may be deflected in an undesired manner. Such effects may cause part of the light to be emitted from the second side 108 in a wide angle. The size of the central light exit surface 118 may therefore be limited in order to prevent light that has been subject to TIR to pass through the central light exit surface 118. On the other hand, this implies that light entering the body 102 through the central light entry surface 114 may exit through the second side 108 outside the central light exit surface 118 and through the peripheral light exit surface 117 instead, see ray 13 in FIG. 2. Hence, if a ray of light that is supposed to pass through the central collimating lens exits the second side 108 through the peripheral light exit surface 117, such ray may be deflected in an undesired manner.

Hence, it is an insight of the invention that there is a conflict in controlling the light emitted entering the body 102 through the central light entry surface 114 and controlling the light that is subject to total internal reflection by the side surface 116 of the body 102. As schematically illustrated in FIG. 2, the central light exit surface 118 may be convex and larger than surface 114 so as to form a narrow cone angle of the emitted light, as shown by the rays 11 in FIG. 1. However, such a large convex central light exit surface 118 needs to be limited in size by its relationship to the total internal reflection surface 116, since the light having been subject to total internal reflection should not exit the body 102 through the central light exit surface 118 as it may direct the light away from the main axis along which the collimated light from the optical system is directed. As illustrated by the ray 12, light that is emitted from the bottom edge of the total internal reflection surface 116 therefore limits the size of the central light exit surface 118. This limitation in size will on the other hand result in outer parts of the beam of light that enters the central light entry surface 114 to be directed to hit the second side 108 of the body 102 outside the central light exit surface 118, as illustrated by the ray 13. Hence, this light will be refracted away from the main axis resulting in that light is emitted from the optical system in a wide angle.

As illustrated in FIGS. 3-7, showing different embodiments of the present invention, the optical system 100 is therefore provided with a rejection area 120, which is arranged surrounding the central light entry surface 114. The rejection area 120 is arranged to prevent incoming light incident on the rejection area 120 to exit the body 102 through the second side 108. Hence, the rejection area 120 may prevent light that otherwise may have been deflected in an undesired manner in the second side 108 from at all exiting the body 102 through the second side 108. This implies that the optical system 100 may be designed to act on incoming light so as to provide a well-collimated light beam having both a contribution of light passing through the central collimating lens and light being subject to TIR in the TIR surface 116. This design may be achieved, while the rejection area 120 prevents incoming light from entering the body 102 through the central light entry surface 114 and exiting the body 102 through the second side 108 outside the central light exit surface 118. Also, incoming light entering the body 102 through the side light entry surface 112 and being subject to TIR in the TIR surface 116 will not exit the body 102 through the central light exit surface 118. Hence, based on the insight above, the optical system 100 according to the invention is provided with the rejection area 120 in order to prevent rays from the light source 106 to be emitted from the optical system 100 in a wide angle. Hence, the rejection area 120 facilitates designing of the optical system 100 to provide a light beam that is emitted from the optical system 100 with a narrow emission angle.

However, the rejection area 120 need not completely enclose the central light entry surface 114 in order for the optical system 100 to provide a desired emission of light from the body 102. For instance, the rejection area 120 may be discontinuous around the central light entry surface 114, such that there are portions not preventing incoming light from entering the body 102 through the central light entry surface 114 and exiting the body 102 through the second side 108 outside the central light exit surface 118. Hence, there may be some small openings in the rejection area 120, but if these openings are sufficiently small, the effect on the emitted light may be so slim as to barely be observable by a user. In other words, the rejection area 120 may provide the desired function on a sufficiently large portion around the central light entry surface 114 as to provide a desired net effect on the optical system 100.

Also, in the context of the present application, the rejection area 120 should therefore be consider to "surround" the central light entry surface 114, even if the rejection area 120 does not necessarily completely enclose the central light entry surface 114.

Figure 3:
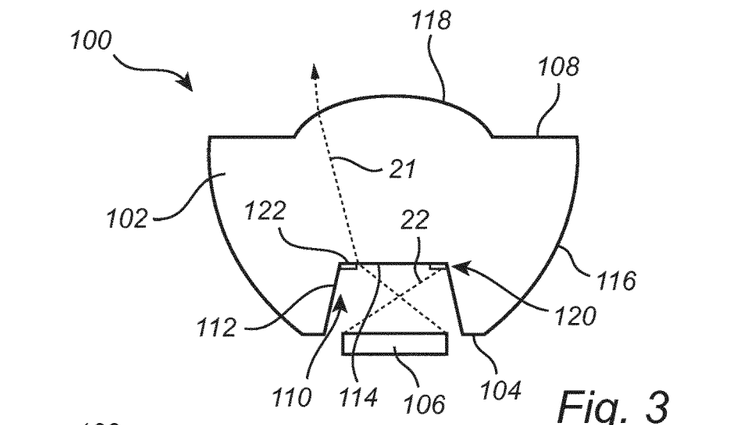
FIG. 3 illustrates an optical system according to a first embodiment of the invention.

According to a first embodiment, as illustrated in FIG. 3, the rejection area 120 may comprise a layer 122 of material that interacts with the incoming light. The material may be arranged to absorb incoming light such that no light is able to pass through the layer 122. Alternatively or additionally, the material may be arranged to scatter incoming light. Hence, the incoming light may be diffusely scattered by the layer 122 of material. The material may be arranged to mainly scatter light in a backwards direction. This implies that the layer 122 of material may be sufficiently thick such that no light is able to pass through the layer 122. As a further alternative, the layer 122 may be arranged to specularly reflect light in a backwards direction.

The layer 122 of material may be applied to the bottom of the recess 110 closest to the side wall 112. The recess 110 may have a transition portion between the side wall 112 and the bottom of the recess 110, which may be angled in relation to the bottom. Also, the transition portion may be curved so as not to form sharp edges in the recess 110. The layer 122 of material may then be applied to such a transition portion. The layer 122 of material may form an annular shape around the central light entry surface 114.

Thanks to the absorption, scattering, or specular reflection of light in the layer 122, incoming light is prevented from entering the body 102 through the central light entry surface 114 and exiting the body 102 through the second side 108 outside the central light exit surface 118. As illustrated by ray 21, light incident on an edge of the central light entry surface 114 to the layer 122 may be deflected by the central light entry surface 114 to an edge of the central light exit surface 118. A ray 22 incident on the layer 122 of material will be prevented from entering the body 102.

Figure 4:
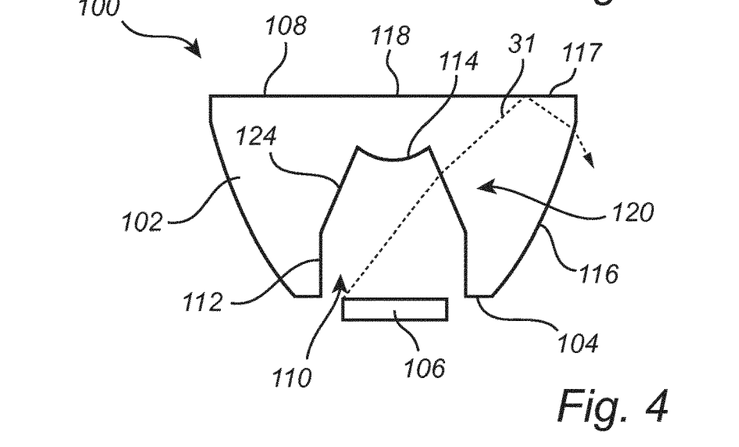
FIG. 4 illustrates an optical system according to a second embodiment of the invention.

According to a second embodiment, as illustrated in FIG. 4, the rejection area 120 may comprise side wall portions 124 of the recess 110 at the bottom of the recess 110. These side wall portions 124 may form a light-deflecting portion. Incoming light incident on the side wall portion 124 may be deflected towards the peripheral light exit surface 117 of the second side 108 of the body 102. However, the light is deflected to be incident on the peripheral light exit surface 117 at an angle larger than a TIR critical angle of the peripheral light exit surface 117. This implies that the light will be subject to total internal reflection in the peripheral light exit surface 117 and will not be allowed to exit the body 102 through the second side 108.

The side wall portion 124 of the recess 110 may be arranged to extend in a direction forming a small angle to an optical axis of the incoming light. This implies that the incoming light may hit the side wall portion 124 at an oblique angle, such that the light is deflected in a large angle away from the central light entry surface 114, whereby the light being directed to the peripheral light exit surface 117 of the second side 108 at an angle larger than the total reflection critical angle is facilitated. The side wall portion 124 may be an extension of the side light entry surface 112 of the recess 110. The side wall portion 124 may also form an angle to the side light entry surface 112, such that the angle of light incident on the side wall portion 124 and the side light entry surface 112, respectively, may be individually adapted to the desired effect on incoming light.

The use of the side wall portions 124 may particularly facilitate that the recess 110 may be arranged to extend far into the body 102. This implies that the central light entry surface 114 may be arranged to receive light having a small angular cone, since the central light entry surface 114 may be arranged at a distance away from the light source 106. Hence, the optical system 100 may be arranged to emit a well-collimated beam from the central light exit surface 118, since the incoming light entering the central light entry surface 114 has a small angular cone.

As the incoming light may be provided having a small angular cone, the central light exit surface 118 may not need to be convex in order to emit well-collimated light. Hence, with the use of side wall portions 124 and a recess 110 extending far into the body 102, it may be particularly advantageous to have a flat central light exit surface 118. The central light exit surface 118 may thus constitute a portion of the second side 108 of the body 102, wherein the second side 108 is a wholly flat surface. The central light exit surface 118 may anyway be a distinct portion of the second side 108, since light entering the body 102 through the central light entry surface 114 will only exit the body 102 through the central light exit surface 118, whereas light entering the body 102 through the side light entry surface 112 will only exit the body 102 through the peripheral light exit surface 117 of the second side 108. The the peripheral light exit surface 117 is arranged outside the central light exit surface 118.

Thanks to the side wall portion 124, incoming light is prevented from entering the body 102 through the central light entry surface 114 and exiting the body 102 through the peripheral light exit surface 117. As illustrated by ray 31, light incident on the side wall portion 124 may be deflected so as to be incident on the peripheral light exit surface 117 with an angle larger than the TIR angle. The ray 31 of light may thus be reflected in the peripheral light exit surface 117 and may exit the body backwards through the TIR surface 116.

Figure 5:
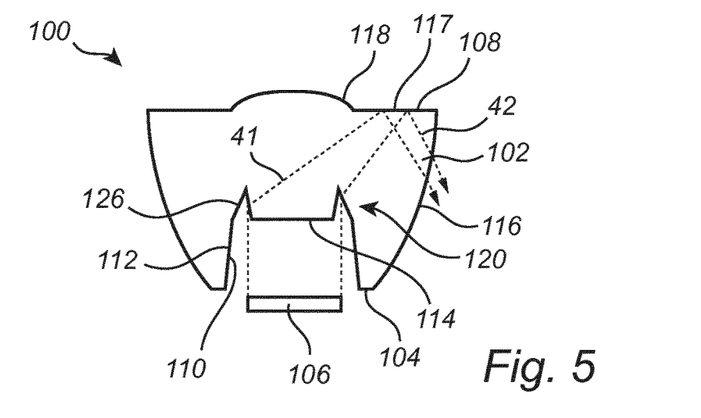
FIG. 5 illustrates an optical system according to a third embodiment of the invention.

According to a third embodiment, as illustrated in FIG. 5, the rejection area 120 may comprise an indentation 126 extending into the body 102 around the central light entry surface 114 at the bottom of the recess 110. The indentation 126 may form a light-deflecting portion. Incoming light entering the indentation 126 may be deflected in an indentation surface towards the peripheral light exit surface 117 of the second side 108 of the body 102. However, the light is deflected to be incident on the peripheral light exit surface 117 at an angle larger than a TIR critical angle of the peripheral light exit surface 117. This implies that the light will be subject to total internal reflection in the peripheral light exit surface 117 and will not be allowed to exit the body 102 through the second side 108.

The indentation 126 may comprise concave surfaces. This implies that the incoming light entering the indentation 126 is ensured to be incident on the surfaces of the indentation 126 at an oblique angle. Hence, the light is deflected in a large angle away from the central light entry surface 114, facilitating the light being directed to the peripheral light exit surface 117 at an angle larger than the total reflection critical angle.

Thanks to the indentation 126, incoming light is prevented from entering the body 102 through the central light entry surface 114 and exiting the body 102 through the peripheral light exit surface 117. As illustrated by ray 41, light incident on an inner surface of the indentation 126, closest to the central light entry surface 114 may be deflected so as to be incident on the peripheral light exit surface 117 with an angle larger than the TIR angle. Also, as illustrated by ray 42, light incident on an outer surface of the indentation 126, farthest away from the central light entry surface 114 may be deflected so as to be incident on the peripheral light exit surface 117 with an angle larger than the TIR angle. The rays 41 and 42 of light may thus be reflected in the peripheral light exit surface 117 and may exit the body backwards through the TIR surface 116.

Figure 6:
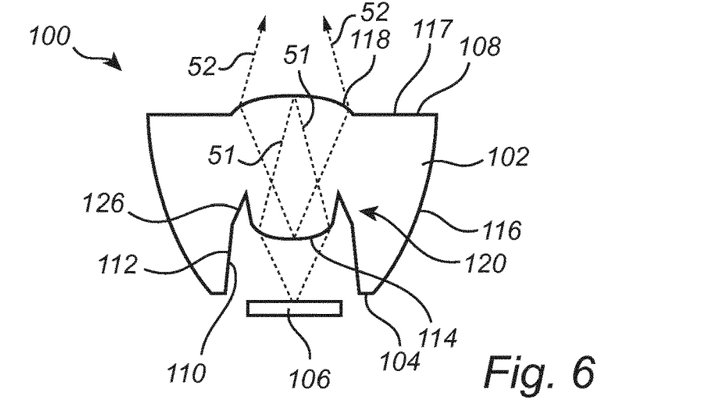
FIG. 6 illustrates a specific variant of the optical system according to the third embodiment of the invention.

As illustrated in FIG. 6, the central collimating lens of the optical system 100 may be formed from a convex central light entry surface 114 and a convex central light exit surface 118. The convex central light entry surface 114 may be arranged to image the light source 106 onto the central light exit surface 118, as illustrated by rays 51. The central light exit surface 118 may in turn form an image of the central light entry surface 114 into infinity, as illustrated by rays 52. In such setup, the central light entry surface 114 and the central light exit surface 118 form Köhler integrating lenses. The setup not only facilitates forming of an emitted light beam with a narrow emission angle, but also may function to eliminate any artifacts from luminance and color non-uniformities of the light source 106.

Figure 7:
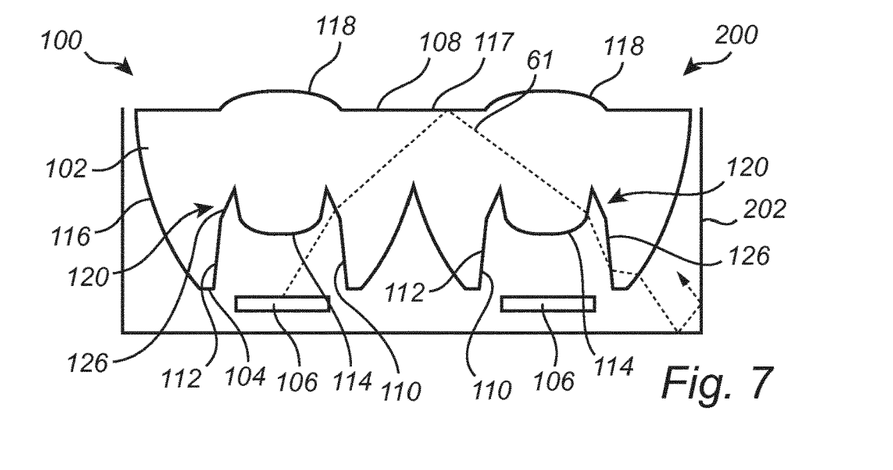
FIG. 7 illustrates a lighting device making use of the optical system according to the third embodiment of the invention.

FIG. 7 discloses a lighting device 200. The lighting device 200 comprises a plurality of light sources 106, which may be arranged in an array so as to form a uniform illumination. The light sources 106 may be formed in a hexagonal array, which may be advantageous in providing a uniform illumination from the lighting device 200, such that no dark voids are created in the illumination between the contributions from the different light sources 106.

The optical system 100 may comprise a body 102 that comprises a plurality of recesses 110. Hence, the optical system 100 may be formed as a single, unitary body 102 which may be arranged over the plurality of light sources 106. Each recess 110 of the body 102 may thus have a central light entry surface 114 for receiving incoming light from a respective light source 106. Further, a rejection area 120 may be arranged surrounding the central light entry surface 114 of each recess 110. Any of the types of rejection areas 120 described above in the first, second, and third embodiments may be provided.

The second side 108 of the body 102 may be provided with a plurality of central light exit surface 118, wherein each central light exit surface 118 is arranged to form a central collimating lens together with a corresponding central light entry surface 114. The central collimating lenses may be formed according to any one of the described embodiments above.

A rejection area 120 comprising a light-deflecting portion may act to deflect the incoming light onto the second side 108, such that the light is incident on a peripheral light exit surface 117 of the second side 108 between the plurality of central light exit surfaces 118 formed in the second side 108. The light deflected from the light-deflecting portion of the rejection area 120 will then be subject to total internal reflection in the peripheral light exit surface 117 and be reflected back into the body 102.

The body 102 may further comprise a TIR surface 116 around each recess 110 providing total internal reflection of light entering the body 102 through a side light entry surface 112. The TIR surfaces 116 associated with adjacent recesses 110 may be connected to each other so that the body 102 is formed as a single unit.

The lighting device 200 may further comprise a specularly or diffusely reflective enclosure 202, which is arranged around the side surfaces 116 and the first side 104 of the body 102 of the optical system 100. The enclosure 202 may have openings for the respective light sources 106 so as to allow light from the light sources to enter the body 102. Alternatively, the enclosure 202 may be arranged around the light sources 106 as well so that the light sources 106 are mounted inside the enclosure 202. The reflective enclosure 202 may reflect any light leaving the body 102 other than through the second side 108. This implies that the light may be reflected back into the body 102 and may eventually leave the body 102 through the second side 108 providing a background level contribution to the light emitted from the optical system 100.

As illustrated by ray 61 in FIG. 7, the light deflected by an indentation 126 may be subject to TIR in the peripheral light exit surface 117 and may reach the reflective enclosure 202, possibly after interacting with a portion of the body 102 associated with another light source 106. The light may then be reflected back by the enclosure 202 into the body 102 so as to contribute to light emitted from the body 102. In this regard, the light deflected by the rejection area 120 may contribute to the overall illumination provided by the lighting device 200, and the deflected light could be said to be recycled in the lighting device 200.

As an alternative, the optical system 100 may be provided with a plurality of bodies 102, which each are associated with a respective light source 106. The plurality of bodies 102 and light sources 106 may then be arranged in an array for forming a lighting device 200 that provides illumination from a plurality of light sources 106.

The person skilled in the art realizes that the present invention by no means is limited to the preferred embodiments described above. On the contrary, many modifications and variations are possible within the scope of the appended claims. For example, the layer 122 of material that interacts with the incoming light may be used in combination with a light-deflecting portion. The layer 122 of material may thus, for example, be provided on part of the light-deflecting portion, on a portion of the central light entry surface 114 surrounded by the light-deflecting portion, or at a transition between the light-deflecting portion and the side light entry surface 112.

Further, a reflective enclosure 202 as described with reference to FIG. 7 may be used in connection with a single light source 106 and an associated optical system 100.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An optical system for collimation of incoming light, comprising:
   a body;
   a recess formed on a first side of the body, the recess having a central light entry surface and a side light entry surface;
   a central light exit surface provided on at least a portion of a second side of the body, said central light entry surface being arranged in relation to the central light exit surface such that incoming light falling on the central light entry surface is directed to the central light exit surface;
   a total internal reflection surface provided at a side surface of the body, which is arranged such that incoming light falling on the side light entry surface of the recess is directed towards the total internal reflection surface so as to be subject to total internal reflection towards the second side of the body; and
   a rejection area surrounding at least a portion of said central light entry surface, said rejection area being configured to prevent incoming light incident on the rejection area to exit said body outside of the central light exit surface, wherein the rejection area comprises a light-deflecting portion being arranged such that incoming light entering the light-deflecting portion is deflected.

2. The optical system according to claim 1, said light-deflecting portion being arranged such that said incoming light entering the light-deflecting portion is directed towards the second side with an angle larger than a total internal reflection critical angle.

3. The optical system according to claim 2, wherein the light-deflecting portion comprises an indentation extending from said recess into said body.

4. The optical system according to claim 3, wherein the indentation comprises a concave surface.

5. The optical system according to claim 2, wherein the light-deflecting portion comprises a side wall portion of said recess.

6. The optical system according to claim 5, wherein the central light exit surface is flat.

7. The optical system according to claim 1, wherein the central light exit surface is convex.

8. The optical system according to claim 1, wherein the rejection area comprises a layer of material which absorbs, scatters, or specularly reflects incoming light, said layer being arranged on a surface surrounding said central light entry surface.

9. The optical system according to claim 1, wherein the central light entry surface and the central light exit surface are arranged in relation to each other so as to form Köhler integrating lenses.

10. The optical system according to claim 1, wherein the body comprises a plurality of recesses, each having a central light entry surface for receiving incoming light, and a plurality of rejection areas, each being arranged surrounding a central light entry surface.

11. A lighting device comprising an optical system according to claim 1 and a light source arranged in dose relation to the recess of the optical system.

12. The lighting device according to claim 11, further comprising a reflective enclosure, which is arranged around the side surface and the first side of the body of the optical system.

* * * * *